United States Patent [19]

Kishita et al.

[11] Patent Number: 5,204,436

[45] Date of Patent: Apr. 20, 1993

[54] CURABLE SILICONE COMPOSITION AND ITS CURED PRODUCT

[75] Inventors: Hirofumi Kishita, Annaka; Kouichi Yamaguchi, Takasaki; Kouji Takano, Annaka; Shuji Suganuma, Takasaki, all of Japan

[73] Assignee: Shin-Etsu Chemical Co., Ltd., Tokyo, Japan

[21] Appl. No.: 739,857

[22] Filed: Aug. 2, 1991

[30] Foreign Application Priority Data

Aug. 3, 1990 [JP] Japan .................. 2-206529

[51] Int. Cl.$^5$ .......................... C08G 77/06
[52] U.S. Cl. ...................... 528/15; 525/478; 528/32; 528/42
[58] Field of Search ............... 528/15, 42, 32; 525/478

[56] References Cited

U.S. PATENT DOCUMENTS

| 4,036,807 | 7/1977 | Atherton. | |
|---|---|---|---|
| 4,985,526 | 1/1991 | Kishita et al. | 528/42 |
| 5,073,422 | 12/1991 | Konno et al. | 528/42 |

FOREIGN PATENT DOCUMENTS 2096631 10/1982 United Kingdom.
2096632 10/1982 United Kingdom.

OTHER PUBLICATIONS

Chemical Abstracts, vol. 88, No. 14, Apr. 3, 1978, p. 1, No. 90066v, Y. A. Yuzhelevskii, et al., "New Poly(Methylfluoroalkylsiloxanes)".

Primary Examiner—Melvyn I. Marquis
Attorney, Agent, or Firm—Oblon, Spivak, McClelland, Maier & Neustadt

[57] ABSTRACT

A curable silicone composition comprising:
(A) an alkenyl group-containing organopolysiloxane containing silicon-bonded alkenyl groups and a silicon-bonded fluorine-containing substituent having the general formula (1):

$$Rf-O-Y- \qquad (1)$$

wherein Rf is a perfluoroalkenyl group having 5 to 10 carbon atoms, and Y represents a divalent organic group,
(B) an organohydrogenpolysiloxane, and
(C) a catalyst for addition reaction between components (A) and (B). This composition can form a cured coating which adheres firmly to various substrates and has good release properties, stability in the release properties, water- and oil-repellency, and solvent resistance. The coating exhibits good release properties even against pressure sensitive adhesives comprising a dimethylpolysiloxane.

11 Claims, No Drawings

CURABLE SILICONE COMPOSITION AND ITS CURED PRODUCT

BACKGROUND OF THE INVENTION

1. Field of the Invention

The present invention relates to a curable silicone composition, in particular to a silicone composition useful as various release agents and the like capable of forming coatings with a low surface energy and its cured product.

2. Description of the Prior Art

For pressure sensitive tapes and pressure sensitive labels, pressure sensitive adhesives are used. Where the pressure sensitive adhesive is used, a release agent comprising, for example, a curable silicone composition, etc. is also often used.

For example, a rolled pressure sensitive tape is required to be unrolled when subjected to use, and therefore release coating has been formed on the back of the tape so that the unrolling operation can be conducted smoothly and a pressure sensitive agent may remain on one side of the tape without fail. Pressure sensitive labels in the form of sheet have release coating on the surface of their backing so that the labels can be peeled smoothly from the backing when subjected to use and no pressure sensitive agent may remain on the backing.

Such release coatings need to adhere to the back of the tapes or the surface of the backing and to have sufficient cohesion so that a pressure sensitive agent may not immigrate. Release agents capable of forming coatings with such a good release property include curable silicones disclosed in Japanese Pre-examination Patent Publication (Kokai) No. 62-225581(1987), Japanese Pre-examination Patent Publication (Kokai) No. 63-320(1988), etc. These curable silicones contain as a major component an organopolysiloxane having a fluorine-containing substituent represented by the formula: $C_nF_{2n+1}CH_2CH_2—$ (where n is an integer of 1 or more).

By the way, in recent years, pressure sensitive adhesive agents containing as a major component a dimethylpolysiloxane are used for wide purposes because of their heat resistance, cold resistance, chemical resistance and electrical insulation properties. Since the pressure sensitive agents are non-toxic, they are also used in the medical field.

The release agents comprising conventional curable silicones cannot offer a sufficient release property, however, because the pressure sensitive adhesive of this type have extremely strong adhesion. Particularly, where a tape or a label on which this pressure sensitive agent is used is stored for a long time, peel force required to peel it from the back of the tape or the backing would increase seriously, so that the pressure sensitive agent layer or the release agent layer is broken when peeling is conducted, and thereby the pressure sensitive tape (or the label) would become useless. The release agent composed of the above-mentioned silicone containing as a major component an organopolysiloxane having a fluorine-containing substituent, does not offer satisfactory release properties in this respect, either.

SUMMARY OF THE INVENTION

An object of the present invention is to provide a curable silicone composition capable of forming a coating having a markedly small surface energy, good release properties and good time stability in the release properties.

Thus, the present invention provides, as a means achieving said objects, a curable silicone composition comprising:

(A) an alkenyl group-containing organopolysiloxane containing at least two silicon-bonded alkenyl groups and at least one silicon-bonded fluorine-containing substituent having the general formula (1):

$$Rf—O—Y— \qquad (1)$$

wherein Rf is a perfluoroalkenyl group having 5 to 10 carbon atoms, and Y represents a divalent organic group, the total amount of said fluorine-containing substituent is 0.5 mol % or more based on all of the organic groups bonded to silicon atoms, (B) an organohydrogenpolysiloxane containing at least two silicon-bonded hydrogen atoms, and (C) a catalyst for addition reaction between silicon-bonded alkenyl groups and silicon-bonded hydrogen atoms, the molar ratio of the silicon-bonded hydrogen atoms of said component (B) to the silicon-bonded alkenyl groups of said component (A) being 0.5 or more.

The present invention also provides a cured product obtained by curing the curable silicone composition above.

The curable silicone composition of the present invention is capable of adhering firmly to a variety of substrates such as paper, rubber, plastic film, metal sheet, metal foil, glass, etc., and being cured sufficiently to form a film having a low surface energy.

The film thus obtained has excellent release properties as well as excellent water- and oil-repellency. For example, when the film is in contact with a pressure sensitive adhesive having a high tack, such as a dimethylpolysiloxane pressure sensitive adhesive, they can be peeled from each other with a peel force sufficiently low for practical use, and the excellent release property is maintained stably for long time. Furthermore, the silicone component in the film will not be transferred to the pressure sensitive adhesive. Therefore, the film is excellent for use as a release agent for pressure sensitive adhesive tapes or adhesive labels.

In addition, the cured product obtained by curing the curable silicone composition according to the present invention has excellent resistance to solvents.

DETAILED DESCRIPTION OF PREFERRED EMBODIMENTS (A) An Alkenyl Group-containing Organopolysiloxane The curable silicone composition of the present invention contains as component (A) an alkenyl group-containing organopolysiloxane. The alkenyl group possessed by component (A) includes, for example, $C_2$ to $C_8$ alkenyl groups. Practically, the vinyl group and the allyl group are preferred, and at least two of the groups are preferably contained in the molecule.

Such a component (A) is represented by, for example, the general formula (2):

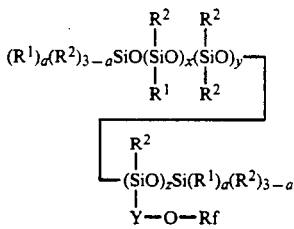

wherein $R^1$ is a $C_2$ to $C_5$ alkenyl group, $R^2$ may be the same or different and are each a hydrogen atom, a $C_1$ to $C_8$ alkyl group or a phenyl group, Rf and Y are as defined above, and a, x, y and z are an integer of $0 \leq a \leq 3$, $x \geq 0$, $y \geq 0$ and $z \geq 1$, respectively.

In the general formula (2) above, the $C_2$-$C_5$ alke group represented by $R^1$ includes, for example, the vinyl group, the allyl group and the like, the $C_{1-8}$ alkyl group, for example, includes methyl, ethyl, propyl, butyl and the like.

Among the perfluoroalkenyl groups having 5 to 10 carbon atoms described above ($C_nF_{2n-1}$— where n is an integer of 5 to 10), typical ones are the groups represented by $C_6F_{11}$— and $C_9F_{17}$—. The group $C_6F_{11}$— includes, for example,

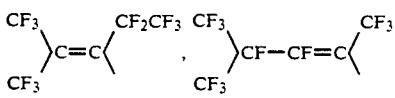

and the group $C_9F_{17}$— includes, for example,

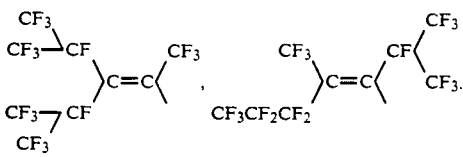

The divalent organic group represented by Y includes, for example, alkylene groups arylene groups, and talkylene-arylene groups such as —CH$_2$—, —CH$_2$CH$_2$—, —CH$_2$CH$_2$CH$_2$—,

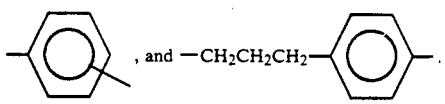

a is an integer of 0 to 3, preferably 1 to 3. x and y are an integer of 0 or more, practically 5 to 10,000. z is an integer of 1 or more, practically 1 to 3,000.

Total amount of the fluorine-containing substituents contained in component (A) needs to be 0.5 mol % or more, preferably 2 mol % or more base on all of the organic groups bonded to silicon atoms. If the amount of the fluorine-containing group is too small, the surface energy may not be lowered sufficiently, thus surface properties not being improved.

(B) Organohydrogenpolysiloxane

The curable silicone composition of the present invention contains as component (B) an organohydrogenpolysiloxane. The component (B) preferably contains the fluorine-containing substituent represented by the general formula (1), and particularly preferably the amount of the substituent is 3 mol % or more based on all of the organic groups bonded to silicon atoms in view of compatibility with the alkenyl group-containing organopolysiloxane of component (A) and release properties obtained. The substituents other than the fluorine-containing substituent are each an alkyl group having 1 to 8 carbon atoms such as methyl, ethyl, propyl or the like or a phenyl group. The organohyyrogenpolysiloxane of this type includes, for example, polymers composed of plural units selected from $R^2HSiO$ units, $HSiO_{1.5}$ units, $(R^2)_2SiO$ units, $R^2SiO_{1.5}$ units, $(R^2)_2HSiO_{0.5}$ units, $(R^2)_3SiO_{0.5}$ units, $R^2RfSiO$ units and $RfSiO_{1.5}$ units wherein in the formulas Rf is as defined in respect of said general formula (1), and $R^2$ is as defined in respect of said general formula (2). These may be linear, branched or cyclic.

From the practical viewpoint, component (B) is a linear polymer represented by, for example, the general formula (3):

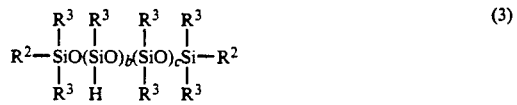

wherein $R^2$ is as defined above, $R^3$ represents a $C_{1-8}$ alkyl group, phenyl group or a fluorine-containing substituent including the one of the general formula (1) and other ones; b is an integer of 1 or more selected so that the number of silicon-bonded hydrogen atoms in the molecule may be 2 or more, normally 3 or more; and c is an integer of 0 or more, normally 0 to 1,000.

As represented by said general formula (3), component (B), the organohydrogenpolysiloxane, is not always required to have fluorine-containing substituents. However, for example, if all of the groups $R^3$ in said general formula (3) are alkyl groups or a phenyl group, compatibility of component (B), the organohydrogenpolysiloxane, with component (A), the alkenyl group-containing organopolysiloxane may be lowered, causing unevenness in coating obtained when the resulting composition is applied. Therefore, at least part of $R^3$ are preferably composed of fluorine-containing substituents, and more preferably are composed of the fluorine-containing substituent represented by said general formula (1).

Component (B) is used in the curable silicone composition of the invention in such an amount that the number of the silicon-bonded hydrogen atoms in component (B) is 0.5 or more per silicon-bonded alkenyl group in component (A). The ratio of the silicon-bonded alkenyl groups in component (A) to the silicon-bonded hydrogen atoms in component (B) is preferably from 1:0.5 to 1:10, more preferably from 1:1 to 1:5.

(C) Catalyst

The curable silicone composition of the present invention contains as component (C) a catalyst. Component (C) is a catalyst to promote addition reaction between component (A) and component (B) described above, and any known catalysts of this type may be used. Such catalysts include, for example, elemental metals selected from platinum family metals such as platinum, rhodium, ruthenium and iridium, and metal compounds thereof. Among these, preferred as component (C) is a platinum catalyst, including specifically e.g. chloroplatinic acid, complexes of chloroplatinic acid with various olefins or vinylsiloxanes, platinum black, and platinum carried on various carriers.

Component (C) may be added in such an amount as has been conventionally adopted in the curable silicone compositions which use addition reaction of the type above. That is, the amount may be in the range from 1 to 1,000 ppm by weight in terms of platinum based on the total amount of said components (A) and (B).

Other Components

The curable silicone composition of the present invention can be obtained by formulating components (A), (B) and (C) described above in given amounts. To control the activity of component (C), the catalyst, a retarding agent such as various organic nitrogen compounds, organic phosphorus compounds, acetylene compounds, oxime compounds, organic chloro compounds or the like may be added if necessary.

Moreover, to the curable silicone composition of the present invention may be added a filler to decrease thermal shrinkage on curing, to lower the thermal expansion coefficient of elastomers obtained by curing, to improve the thermal stability, weather-resistance, chemical resistance, flame resistance or mechanical strength of the elastomers or to reduce gas permeability of the elastomers. The filler includes, for example, fumed silica, quartz powders, glass fibers, carbons, metal oxides such as iron oxides, titanium oxides and cerium oxides, carbonates such as calcium carbonate and magnesium carbonate. To the compositions can be added suitable pigments, dyes or antioxidants if necessary.

The curable silicone composition of the present invention may be diluted with a suitable solvent such as chlorofluorocarbon, xylene hexafluoride, perfluorooctane, benzotrifluoride and methyl ethyl ketone according to the situation of use.

Uses

Application of the curable silicone composition thus obtained can be conducted by known techniques such as roll-coating, spraying, dipping, etc. depending on a substrate to be coated, coating weight, etc. After application, the composition may be cured by known techniques such as room temperature curing, heat curing, UV curing, etc., preferably by heat curing, for example, at 100° C. for 30 seconds or more, thereby producing a coating with a low surface energy.

Since the curable silicone composition of the present invention produces a coating with a low surface energy, it is useful not only as a release agent for pressure sensitive tapes and pressure sensitive labels but also as a release agent for various metal molds for molding rubbers or plastics and a coating material for preventing scribbling, posting bills or icing. It is also useful as a water repellency agent for textiles for making raincoats, tents, carpets, etc. water repellent, a waterproofing agent or water repellency agent for construction materials such as materials of outer walls, materials of bath room walls, etc., and a moisture proof coating agent for printed boards, electronic parts, etc.

The cured product of the present invention can be obtained by pouring the curable silicone composition described above into, e.g., a mold or the like and then curing it by a known technique such as room temperature curing, heat curing, UV curing, etc., preferably by heat-curing, e.g., at 25° C. for 24 hours or longer or at 100° C. for 30 sec. or longer. The cured product thus obtained is a rubberlike elastic material.

The rubberlike elastic material made from the curable silicone composition has a good release property and the uncured composition has good plasticity; hence the composition is useful for forming a mold of objects made of epoxy resins, urethane resins, etc. or useful as a rubber mold for use in casting under vacuum. Since the rubberlike elastic material also has good solvent resistance, it is useful as materials for O-rings, hoses, etc. used in the field of automobiles.

EXAMPLES

The present invention will now be described in more detail below, referring to examples and comparative examples.

Vinyl-containing organopolysiloxanes which were used in the examples and comparative examples as component (A) according to the present invention are shown in Table 1, and organohydrogenpolysiloxanes which were used as component (B) according to the present invention are shown in table 2.

Assigned the mark * in Table 1 are the vinyl-containing organopolysiloxanes which do not fulfill the requirements for component (A) of the present invention and which were used in the comparative examples.

In Tables 1 and 2, the column of Rf includes symbols representing the kind of the fluorine-containing substituent. The fluorine-containing substituents corresponding to the symbols are set forth in Table 3. The fluorine-containing substituents Rf, referred to here are not limited to the fluorine-containing substituents having said general formula (1) but include such fluorine-containing substituents as $F[CF(CF_3)CF_2O]_2CF(CF_3)CH_2O(CH_2)_3$, $CF_3CH_2CH_2$—, etc.

TABLE 1

| | Vinyl-containing polysiloxanes | | | | |
|---|---|---|---|---|---|
| No. | Rf | w | x | y | z |
| V-1 | A | 210 | 0 | 0 | 90 |
| V-2 | B | 210 | 0 | 0 | 90 |
| V-3 | C | 210 | 0 | 0 | 90 |
| V-4 | D | 210 | 0 | 0 | 90 |
| V-5 | C | 270 | 0 | 0 | 30 |
| V-6 | C | 200 | 0 | 10 | 90 |
| V-7 | C | 207 | 3 | 0 | 90 |
| V-8* | B | 297 | 0 | 0 | 3 |
| V-9* | F# | 100 | 0 | 0 | 200 |
| V-10* | — | 300 | 0 | 0 | 0 |

The compounds No. V-1 to V-10 all have the following general formula, and values for w, x, y and z in the formula are given in Table 1.

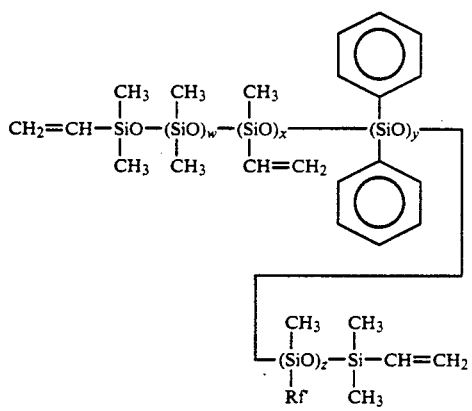

TABLE 2

Organohydrogenpolysiloxanes

| No. | Rf' | Structure |
|---|---|---|
| H-1 | A | (CH$_3$)$_3$SiO—(SiO)$_{25}$—(SiO)$_{25}$—(SiO)$_{50}$—Si(CH$_3$)$_3$ with CH$_3$, H, CH$_3$, Rf', CH$_3$, CH$_3$ substituents |
| H-2 | C | (CH$_3$)$_3$SiO—(SiO)$_{25}$—(SiO)$_{25}$—(SiO)$_{50}$—Si(CH$_3$)$_3$ with CH$_3$, H, CH$_3$, Rf', CH$_3$, CH$_3$ substituents |
| H-3 | F# | (CH$_3$)$_3$SiO—(SiO)$_{25}$—(SiO)$_{25}$—(SiO)$_{50}$—Si(CH$_3$)$_3$ with CH$_3$, H, CH$_3$, Rf', CH$_3$, CH$_3$ substituents |
| H-4 | C | H—SiO—(SiO)$_{25}$—(SiO)$_{25}$—(SiO)$_{50}$—Si—H with CH$_3$, CH$_3$, H, CH$_3$, Rf', CH$_3$, CH$_3$, CH$_3$ substituents |
| H-5 | E# | $\left[ \text{—(SiO)}_3\text{—} \begin{array}{c}\text{CH}_3\\|\\\text{SiO}\\|\\\text{Rf'}\end{array} \text{—} \right]$ with CH$_3$, H |
| H-6 | — | (CH$_3$)$_3$SiO—(SiO)$_{38}$—Si(CH$_3$)$_3$ with CH$_3$, H |

Note:
These all fulfill the requirements for component (B) according to the present invention.

TABLE 3

| Symbol | Fluorine-containing substituents (Rf')<br>Structure |
|---|---|
| A | C$_6$F$_{11}$OCH$_2$CH$_2$CH$_2$— |
| B | C$_6$F$_{11}$O—⟨phenyl⟩—CH$_2$CH$_2$CH$_2$— |
| C | C$_9$F$_{17}$OCH$_2$CH$_2$CH$_2$— |

TABLE 3-continued

| Symbol | Fluorine-containing substituents (Rf')<br>Structure |
|---|---|
| D | C$_9$F$_{17}$O—⟨phenyl⟩—CH$_2$CH$_2$CH$_2$— |
| E# | F(CFCF$_2$O)$_2$CFCH$_2$O(CH$_2$)$_3$— with CF$_3$, CF$_3$ |
| F# | CF$_3$CH$_2$CH$_2$— |

Note:
The substituents marked with # are not fluorine-containing substituent having said general formula (1). Any of the other substituents are a fluorine-containing substituent of the general formula (1).

The compounds shown in Table 1 and 2 were synthesized by the following processes.

Synthesis of V-1

A cyclotrisiloxane having a fluorine-containing substituent having the general formula (4):

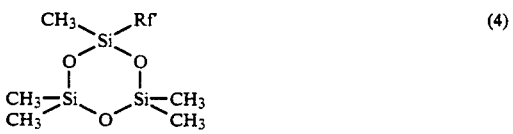

wherein Rf' is —(CH$_2$)$_3$OC$_6$F$_{11}$, 1,1,3,3-tetramethyl-1,3-divinyldisiloxane and hexamethylcyclotrisiloxane were mixed in a mole ratio of 90:1:10. To 100 parts by weight of the mixture, being agitated, was added 0.2 part by weight of CF$_3$SO$_3$H, and the resultant admixture was brought into reaction (equilibration) at room temperature for 10 hours. Thereafter, 0.2 part by weight of 28% aqueous ammonia was added to the reaction mixture, followed by agitation at room temperature for 1 hour. Then, salts formed were removed by a filter paper, and the filtrate was stripped at 150° C. and 5 mmHg for 1 hour, to give a vinyl-containing organopolysiloxane V-1 having the composition as shown in Table 2.

Synthesis of H-1

A cyclotrisiloxane having a fluorine-containing substituent of the above general formula (4), methylhydrogencyclotetrasiloxane and hexamethyldisiloxane were mixed in a mole ratio of 25:6.25:1. According to the synthesis process for V-1 above, 100 parts by weight of the mixture was admixed with 0.2 part by weight of CF$_3$SO$_3$H and reaction (equilibration) was carried out at room temperature for 10 hours. Thereafter, 0.2 part by weight of 28% aqueous ammonia was added to the reaction mixture, followed by agitation at room temperature for 1 hour. Then, salts formed were removed by a filter paper, and the filtrate was stripped at 150° C. and 5 mmHg for 1 hour, to give a vinyl-containing organopolysiloxane H-1 having the composition as shown in Table 2.

Syntheses of V-2 to V-10, H-2 to H4 and H-6

These polysiloxanes were synthesized in the same manner as V-1 or H-1 above, except for choosing a suitable cyclic oligomer according to the intended molecular structure.

Synthesis of H-5

To a mixture of 1 mole of methylhydrogencyclotetrasiloxane and 1 mole of F[CF(CF$_3$)CF$_2$O]$_2$CF(CF$_3$)CH$_2$OCH$_2$CH=CH$_2$, a 2 wt. % solution of chloroplatinic acid in isopropyl alcohol was added so that the amount of platinum would be 50 ppm based on the total weight of the mixture. The resultant admixture was reacted at 80° C. for 3 hour. The reaction product obtained was distilled under a reduced pressure, to give H-5 as a fraction with a boiling point of 107° C. at 3 mmHg.

Examples 1 to 10 and Comparative Examples 1–4

As shown in Table 4, a vinyl-containing organopolysiloxane and an organohydrogenpolysiloxane were mixed with each other so that the ratio of the silicon-bonded vinyl groups in the former polysiloxane to the silicon-bonded hydrogen atoms in the latter polysiloxane (hereinafter referred to as "H/Vi ratio") would have a predetermined value. Five (5) parts of each composition thus obtained was diluted with 95 parts by weight of Freon TF, and 0.05 part by weight of a chloroplatinic acid-vinylsiloxane complex (platinum content: 2%) was added thereto, to prepare a treating solution.

The examples and comparative examples each have characteristics below.

EXAMPLES 1 TO 4

The cases where the kind of the fluorine-containing substituent possessed by the vinyl-containing organopolysiloxane is changed.

EXAMPLE 5

The case where the vinyl-containing organopolysilxane has the same fluorine-containing substituent as in Example 3, but the proportion of said group is changed.

EXAMPLE 6

The case where a vinyl-containing organopolysiloxane which contains a phenyl group is used.

EXAMPLE 7

The case where a vinyl-containing organopolysiloxane having a vinyl group in a side chain is used.

EXAMPLES 8 to 10

The cases where the kind of the fluorine-containing substituent possessed by the organohydrogenpolysiloxane is changed.

COMPARATIVE EXAMPLE 1

The cases where a vinyl-containing organopolysiloxane having a fluorine-containing substituent Rf' different from Rf—O—Y— and not having the Rf—O—Y— is used.

COMPARATIVE EXAMPLE 2

The case where a vinyl-containing organopolysiloxane not having any fluorine-containing substituent Rf is used.

COMPARATIVE EXAMPLE 3

The case where the total amount of fluorine-containing substituents (Rf—O—Y—) in the vinyl-containing organopolysiloxane used is less than 0.5 mol. % based on the total amount of silicon-bonded organic groups.

COMPARATIVE EXAMPLE 4

The case where the H/Vi ratio is less than 0.5.

Each of the treating solutions prepared in the examples and comparative examples was applied to a polyethylene laminated paper by the method described below, to form a cured film. For each of the films thus obtained, peel force and adhesive force (adhesion to backing), after aging at 25° C. or at 70° C., were measured according to the evaluation method described below.

(1) Coating Method

Compositions prepared by mixing a vinyl-containing organopolysiloxane and an organohydrogenpolysiloxane, as shown in Table 4, are each diluted with a Freon TF (a product by Mitsui Dupont Fluoro Chemical Co.) to a concentration of 5%, and applied to a polyethylene laminated paper by a bar coater No.4. The paper thus coated is heated in a hot-air circulation type dryer at 150° C. for 60 seconds, to form a cured film.

(2) Evaluation Method

A silicone pressure sensitive adhesive tape Nitofron No. 903UL (a product by Nitto Denko Corp, width 19 mm) is adhered to the surface of the cured film, and aging is carried out at 25° C. for 24 hours under a load of 20 g/cm$^2$. Similarly, aging at 70° C. is carried out for 24 hours. After the aging, peel force and adhesive force are measured by the following methods (a) and (b).

(a) Measurement of Peel Force

The laminated paper aged at 25° C. or 70° C. was pulled at an angle of 180° and a peel rate of 30 cm/min by a tensile tester, to measure the force (g) required for peeling.

(b) Measurement of adhesive force

The pressure sensitive adhesive tape peeled from the surface of the cured film is attached to a stainless steel sheet, and pulled at an angle of 180° and a peel rate of 30 cm/min, to measure the force (g) required for peeling.

As is clearly seen from Table 4, Examples 1 to 10 all gave a sufficiently low peel force for practical use, and an adhesive force comparable to those obtained on blanks (Teflon sheets). In addition, transfer of the coat to the adhesive did not occur in these examples. On the other hand, a cured film could not be obtained in Example 4, and the cured films obtained in Comparative Examples 1, 2 and 3 were unsuitable for practical use because of the excessively high peel forces, as seen from Table 4.

TABLE 4

| | Composition of treating solution | | | Characteristics | | | |
| | vinyl-containing organo-polysiloxane | organo-hydrogen-polysiloxane | H/Vi ratio | 25° C. | | 70° C. | |
| | | | | peel force | adhesive force | peel force | adhesive force |
| --- | --- | --- | --- | --- | --- | --- | --- |
| Example 1 | V-1 | H-2 | 2.0 | 8 | 620 | 12 | 615 |
| Example 2 | V-2 | H-2 | 2.0 | 10 | 613 | 15 | 620 |
| Example 3 | V-3 | H-2 | 2.0 | 5 | 618 | 7 | 621 |
| Example 4 | V-4 | H-2 | 2.0 | 6 | 613 | 8 | 618 |
| Example 5 | V-5 | H-2 | 2.0 | 10 | 618 | 16 | 610 |
| Example 6 | V-6 | H-2 | 2.0 | 9 | 622 | 15 | 608 |
| Example 7 | V-7 | H-2 | 2.0 | 5 | 609 | 7 | 615 |
| Example 8 | V-3 | H-1 | 1.5 | 8 | 606 | 12 | 618 |
| Example 9 | V-3 | H-4 | 1.5 | 5 | 610 | 7 | 620 |
| Example 10 | V-3 | H-5 | 1.5 | 5 | 621 | 8 | 616 |
| Comp. Ex. 1 | V-9* | H-3 | 2.0 | 328 | 620 | 416 | 619 |
| Comp. Ex. 2 | V-10* | H-6 | 2.0 | *1 | — | *1 | — |
| Comp. Ex. 3 | V-8* | H-6 | 2.0 | 482 | 618 | *1 | — |
| Comp. Ex. 4 | V-2 | H-1 | 0.4* | *2 | — | *2 | — |

Notes
*Not fulfilling the requirements for the present invention.
*1: Peeling was impossible.
*2: Not cured.

Besides, variations in peel force with time were measured for the cured films formed in Examples 1 and 3 and Comparative Example 1. The results are shown in Table 5, in which Si-Vi stands for vinyl-containing organopolysiloxane, and Si-H for organohydrogenpolysiloxane.

TABLE 5

| | Composition of treating solution | | | Pressure contact at 25° C. | | | Pressure contact at 70° C. | | |
| | Si-Vi | Si-H | H/Vi ratio | one day | 15 days | 30 days | one day | 15 days | 30 days |
| --- | --- | --- | --- | --- | --- | --- | --- | --- | --- |
| Example 1 | V-1 | H-2 | 2.0 | 8 | 10 | 12 | 12 | 15 | 21 |
| Example 2 | V-3 | H-2 | 2.0 | 5 | 6 | 8 | 7 | 9 | 11 |
| Comparative Example 1 | V-9 | H-3 | 2.0 | 328 | *1 | *1 | 416 | *1 | *1 |

Note
*1: Peeling was impossible.

EXAMPLE 11 AND COMPARATIVE EXAMPLE 5

In Example 11, V-3 shown in Table 1 as vinyl-containing organopolysiloxane and H-1 shown in Table 2 as organohydrogenpolysiloxane were mixed with each other in such amounts as to give an H/Vi ratio of 1.3. Then, 100 parts by weight of the mixture was admixed with 0.1 part by weight of vinylmethylcyclotetrasiloxane and 0.05 part by weight of said platinum complex salt. The resultant admixture was defoamed in vacuum, and then cured by heating to 100° C. for 3 hours. In Comparative Example 5, on the other hand, V-10* and H-6 were used to obtain respective cured products, in the same manner as in Example 11. The cured products thus obtained were subjected to measurement of hardness, tensile strength and elongation, and also to measurement of volume swell after 24-hour immersion in each of toluene, acetone and ethyl acetate at 25° C. The results are shown in Table 6.

It is seen from the table that a rubberlike elastic material with excellent solvent resistance was obtained in Example 11.

TABLE 6

| | Properties of cured product | |
| Items | Example 11 | Comparative Example 5 |
| --- | --- | --- |
| [Rubber properties] | | |
| Hardness JIS (A) | 8 | 10 |
| Tensile strength (kg/cm$^2$) | 1.7 | 1.9 |
| Elongation (%) | 186 | 190 |
| [Swell in solvent] | | |
| Toluene | 8 | 274 |
| Acetone | 5 | 23 |
| Ethyl acetate | 16 | 163 |

We claim:

1. A curable silicone composition comprising:
    (A) An alkenyl group-containing organopolysiloxane containing at least two silicon-bonded alkenyl groups and at least one silicon-bonded flourine-containing substituent having the general formula (1):

$$Rf-O-Y- \quad (1)$$

wherein Rf is a perfluoroalkenyl group having 5 to 10 carbon atoms, and Y represents a divalent organic group selected from the group consisting of alkylene groups, arylene groups and alkylene-arylene groups, the total amount of said fluorine-containing substituent being 0.5 mol % or more based on all of the organic groups bonded to silicon atoms,
    (B) an organohydrogenpolysiloxane containing at least two silicon-bonded hydrogen atoms, and
    (C) a catalyst for addition reaction between silicon-bonded alkenyl groups and silicon-bonded hydrogen atoms, the molar ratio of the silicon-bonded hydrogen atoms of said component (B) to the silicon-bonded alkenyl groups of said component (A) being 0.5 or more.
2. The composition according to claim 1, wherein the alkenyl group-containing organopolysiloxane (A) is represented by the general formula (2):

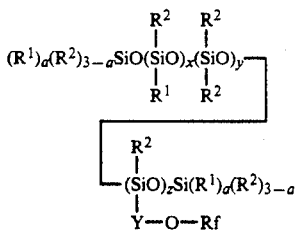

(2)

wherein $R^1$ is $C_2$ to $C_5$ alkenyl group, $R^2$ may be the same or different and are each a hydrogen atom, A $C_1$ to $C_8$ alkyl group or a phenyl group, Rf is a perfluoroalkenyl group having 5 to 10 carbon atoms and Y represents a divalent organic group selected from the group consisting of alkylene groups, arylene groups and alkylene-arylene groups, and a, x, y and z are an integer of $0 \leq a \leq 3$, $x \geq 0$, $y \geq 0$ and $z \geq 1$, respectively.

3. The composition according to claim 2, wherein in the general formula (2), a is an integer of 1 to 3, x and y are each an integer of 5 to 10,000, and z is an integer of 1 to 3,000.

4. The composition according to claim 1, wherein Rf contained in the general formula (1) is $C_nF_{2n-1}$ where n is an integer of 5 to 10, and Y is a group selected from the group consisting of alkylene, arylene and alkylene-arylene groups.

5. The composition according to claim 1, wherein the amount of said fluorine-containing substituent in component (A) is at least 2 mol % based on all of the organic groups bonded to silicon atoms in component (A).

6. The composition according to claim 1, wherein the organohydrogenpolysiloxane (B) contains in its molecule at least 3 mol % of the fluorine-containing substituent of the general formula (1) based on all of the organic groups bonded to silicon atoms in component (B).

7. The composition according to claim 1, wherein the organohydrogenpolysiloxane (B) is represented by the general formula (3):

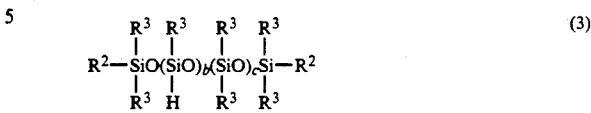

(3)

wherein $R^2$ may be the same or different and are each a hydrogen atom, a $C_1$ to $C_8$ alkyl group or a phenyl group, $R^3$ represents a $C_1$–$C_8$ alkyl group, phenyl group or a fluorine-containing substituent; b is an integer of 1 or more selected so that the number of silicon-bonded hydrogen atoms in the molecule is 2 or more; and C is an integer of 0 or more.

8. The composition according to claim 1, wherein the ratio of the silicon-bonded alkenyl groups in component (A) to the silicon-bonded hydrogen atoms in component (B) is from 1:0.5 to 1:10.

9. The composition according to claim 1, wherein the catalyst (C) is platinum, rhodium, ruthenium or iridium, or a compound of these.

10. A cured product obtained by curing the curable silicone composition as claimed in claim 1.

11. The composition according to claim 1, wherein Y is selected from the group consisting of —$CH_2I$—, —$CH_2CH_2$—, —$CH_2CH_2CH_2$—, 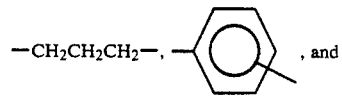 , and —$CH_2CH_2CH_2$—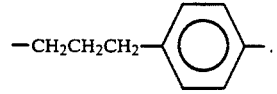 .

* * * * *